US012607979B2

(12) United States Patent
Kang et al.

(10) Patent No.: US 12,607,979 B2
(45) Date of Patent: Apr. 21, 2026

(54) SCAN CELL PLACING METHOD AND SCAN CELL PLACING APPARATUS

(71) Applicant: UIF (University Industry Foundation), Yonsei University, Seoul (KR)

(72) Inventors: Sungho Kang, Seoul (KR); Sang Jun Lee, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 758 days.

(21) Appl. No.: 17/994,866

(22) Filed: Nov. 28, 2022

(65) Prior Publication Data

US 2023/0205172 A1     Jun. 29, 2023

(30) Foreign Application Priority Data

Dec. 28, 2021     (KR) ........................ 10-2021-0189738

(51) Int. Cl.
*G05B 19/4099*          (2006.01)

(52) U.S. Cl.
CPC .................... *G05B 19/4099* (2013.01); *G05B 2219/45031* (2013.01)

(58) Field of Classification Search
CPC .................. G05B 19/4099; G05B 2219/45031
See application file for complete search history.

(56) References Cited

U.S. PATENT DOCUMENTS

| | | | | |
|---|---|---|---|---|
| 6,070,261 | A | 5/2000 | Tamarapalli et al. | |
| 2013/0275824 | A1* | 10/2013 | Tekumalla ............. | G11C 29/32 |
| | | | | 714/E11.155 |

FOREIGN PATENT DOCUMENTS

| | | |
|---|---|---|
| KR | 10-2013-0072425 A | 7/2013 |
| KR | 10-2279047 B1 | 7/2021 |

OTHER PUBLICATIONS

"Kwonhyoung Lee, Sangjun Lee, Jongho Park, Inhwan Lee, and Sungho Kang, A Low-Power BIST Scheme using Weight-Aware Scan Grouping and Scheduling for Automotive ICs, 2017" (Year: 2017).*
Kwonhyoung Lee et al., "A Low-Power BIST Scheme Using Weight-Aware Scan Grouping and Scheduling for Automotive ICs", IEEE Access, Aug. 17, 2021, pp. 116115-116132, vol. 9.
Michal Filipek et al., "Low Power Decompressor and PRPG with Constant Value Broadcast", 2011 Asian Test Symposium, Nov. 20-23, 2011, pp. 84-89, IEEE, New Delhi, India.
Korean Office Action for related KR Application No. 10-2021-0189738 mailed Mar. 13, 2024 from Korean Intellectual Property Office.

(Continued)

*Primary Examiner* — Mark D Featherstone
*Assistant Examiner* — Jeffrey Andrew Yang
(74) *Attorney, Agent, or Firm* — Paratus Law Group, PLLC

(57)          ABSTRACT

There is provided a scan cell placing method including calculating a weight of each scan cell from a deterministic pattern input to a plurality of scan cells, dividing the scan cells into a coverage group and a power group on the basis of the weights, forming a plurality of power subgroups from a result of providing a pseudo random pattern to scan cells belonging to the power group, and scheduling one or more of the power subgroups to reduce peak power in a test process.

24 Claims, 7 Drawing Sheets

(56) References Cited

OTHER PUBLICATIONS

Abdallatif S. Abu-Issa, "Energy-Efficient Scheme for Multiple Scan-Chains BIST Using Weight-Based Segmentation", IEEE Transactions on Circuits and Systems, Mar. 2018, pp. 361-365, vol. 65, No. 3.

Farrokh Ghani Zadegan et al., "Test Scheduling in an IEEE P1687 Environment with Resource and Power Constraints", 2011 Asian Test Symposium, 2011, pp. 525-531.

* cited by examiner

S300

PROVIDE FIRST-CYCLE PSEUDO RANDOM PATTERN TO SCAN CELLS BELONGING TO POWER GROUP — S310

FORM FIRST DETERMINISTIC PATTERN WITH RESPECT TO FAULT THAT IS NOT DETECTED USING FIRST-CYCLE PSEUDO RANDOM PATTERN — S320

CLASSIFY SCAN CELLS TO WHICH FIRST DETERMINISTIC PATTERN IS PROVIDED AND IN WHICH BITS ARE 0 AND 1 AS SAME POWER SUBGROUP — S330

Fig. 6

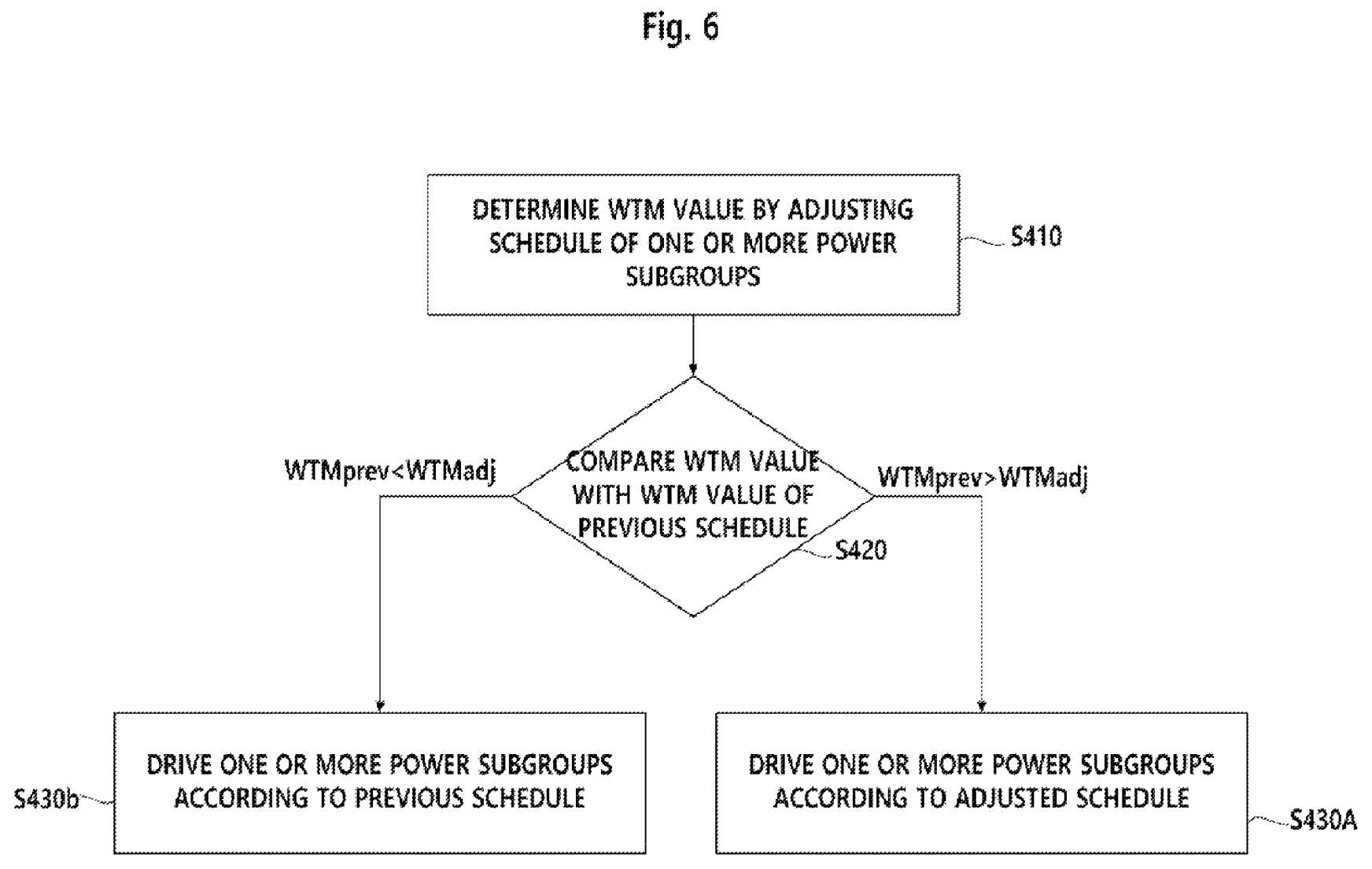

DETERMINE WTM VALUE BY ADJUSTING SCHEDULE OF ONE OR MORE POWER SUBGROUPS ⟍ S410

COMPARE WTM VALUE WITH WTM VALUE OF PREVIOUS SCHEDULE ⟍ S420

WTMprev>WTMadj

WTMprev<WTMadj

DRIVE ONE OR MORE POWER SUBGROUPS ACCORDING TO ADJUSTED SCHEDULE ⟍ S430A

DRIVE ONE OR MORE POWER SUBGROUPS ACCORDING TO PREVIOUS SCHEDULE ⟍ S430b

SCAN CELL PLACING METHOD AND SCAN CELL PLACING APPARATUS

CROSS-REFERENCE TO RELATED APPLICATION

This application claims priority to Korean Patent Application No. 10-2021-0189738 (filed on Dec. 28, 2021), which is hereby incorporated by reference in its entirety.

BACKGROUND

The present disclosure relates to a scan cell placing method and apparatus.

Recently, as the semiconductor industry is rapidly growing, semiconductor test technology has drawn attention. Such a test should comply with strict requirements according to functional safety standards and achieving a desired fault detection rate within a short test time is considered the most important task.

In latest research, a method of adding a combination circuit between each scan chain and linear feedback shift registers (LFSRs) to apply a pseudo random pattern has been suggested. In addition, there are methods of reducing power in a built-in self-test (BIST) method, and a method using a control register that deactivates a scan chain group for each pattern to minimize a toggle level in a BIST using an LFSR.

However, the related art described above is disadvantageous in that as the number of scan cells and the number of chains increase, an area and route overhead of a combination circuit to be added to generate a search space and a pseudo random pattern for finding an answer increase.

An object of the embodiments is to solve the above-described problem of the related art. That is, an object of the embodiments is directed to obtaining high test coverage with a small number of patterns and reducing test power by reducing and dispersing power consumption in a test.

SUMMARY

An embodiment of the present disclosure provides a scan cell placing method including calculating a weight of each scan cell from a deterministic pattern input to a plurality of scan cells, dividing the scan cells into a coverage group and a power group on the basis of the weight, forming a plurality of power subgroups from a result of providing a pseudo random pattern to scan cells belonging to the power group, and scheduling one or more of the power subgroups to reduce peak power in a test process.

An embodiment of the present disclosure provides a scan cell placing apparatus for placing scan cells on which a built-in self-test of a semiconductor circuit is performed, the apparatus including at least one processor, and a memory storing one or more programs executable by the at least one processor, wherein, when the one or more programs are executed by the at least one processor, the at least one processor performs a test method, wherein the test method includes calculating a weight of each scan cell from a deterministic pattern input to a plurality of scan cells, dividing the plurality of scan cells into a coverage group and a power group according to the weights, forming a plurality of power subgroups from a result of providing a pseudo random pattern to scan cells belonging to the power group, and rearranging one or more of the plurality of power subgroups to reduce peak power in a test process.

In an aspect of the embodiment, the deterministic pattern may be generated by an automatic test pattern generator (ATPG).

In an aspect of the embodiment, the calculating of the weight may include calculating a weight by dividing the number of first logic state bits included in a deterministic test pattern provided to the scan cells by a value obtained by subtracting the number of X bits from a total number of bits included in the deterministic test pattern.

In an aspect of the embodiment, the calculating of the weights may include calculating a weight by dividing the number of first logic state bits included in a deterministic test pattern provided to the scan cell by a value obtained by subtracting the number of first logic state bits from the sum of the number of the first logic state bits and the number of second logic state bits complementary to the first logic state bits.

In an aspect of the embodiment, the dividing of the scan cells into the coverage group and the power group may be performed by classifying scan cells having a weight of 0 or more and less than w1 and scan cells having a weight of 1−w1 or more and 1 or less as a coverage subgroup, wherein w1 is a real number greater than or equal to 0 and equal to or less than 1.

In an aspect of the embodiment, the scan cells having the weight of 0 or more and less than w1 may be connected in the same scan chain to the scan cells having the weight of 1−w1 or more and 1 or less by an inverter.

In an aspect of the embodiment, the dividing of the scan cells into the coverage group and the power group may be performed by classifying scan cells having a weight of w1 or more and less than w2 and scan cells having a weight of 1−w2 or more and less than 1−w1 as a second coverage subgroup, wherein w2 is a real number greater than w1 and greater than or equal to 0 and equal to or less than 1.

In an aspect of the embodiment, the scan cells having the weight of w1 or more and less than w2 may be connected in the same scan chain to the scan cells having the weight of 1−w2 or more and less than 1−w1 by an inverter.

In an aspect of the embodiment, the dividing of the scan cells into the coverage group and the power group may be performed by classifying remaining scan cells as the power group.

In an aspect of the embodiment, the forming of the plurality of power subgroups may include providing a first-cycle pseudo random pattern to the scan cells belonging to the power group, forming a first deterministic pattern with respect to a fault that is not detected using the first-cycle pseudo random pattern, and classifying scan cells to which the first deterministic pattern is provided and in which bits are 0 and 1 as the same power subgroup.

In an aspect of the embodiment, the forming of the plurality of power subgroups may be ended when all of the scan cells belonging to the power group belong to the power subgroups or when a plurality of power subgroups are formed in all cycles of the pseudo random pattern.

In an aspect of the embodiment, the scheduling of the one or more of the power subgroups may include determining a weight transition matrix (WTM) value by adjusting the schedule of the one or more of the power subgroups, comparing the WTM value with a WTM value of a previous schedule, and driving the one or more of the power subgroups according to the adjusted schedule when the WTM value of the adjusted schedule is less than the WTM value of the previous schedule.

In an aspect of the embodiment, the scheduling of the one or more of the power subgroups may include determining a WTM value in a current schedule of the one or more of the power subgroups, comparing the WTM value with a WTM value of a previous schedule, and driving the one or more of the power subgroups according to the previous schedule when the WTM value of an adjusted schedule is greater than the WTM value of the previous schedule.

According to the embodiments, scan coverage of scan cells can be improved, and peak power consumption in the BIST can be reduced.

BRIEF DESCRIPTION OF THE DRAWINGS

FIG. 6 is a flowchart schematically illustrating scheduling one or more power subgroups to reduce peak power in a test process.

DETAILED DESCRIPTION

Figure 1:
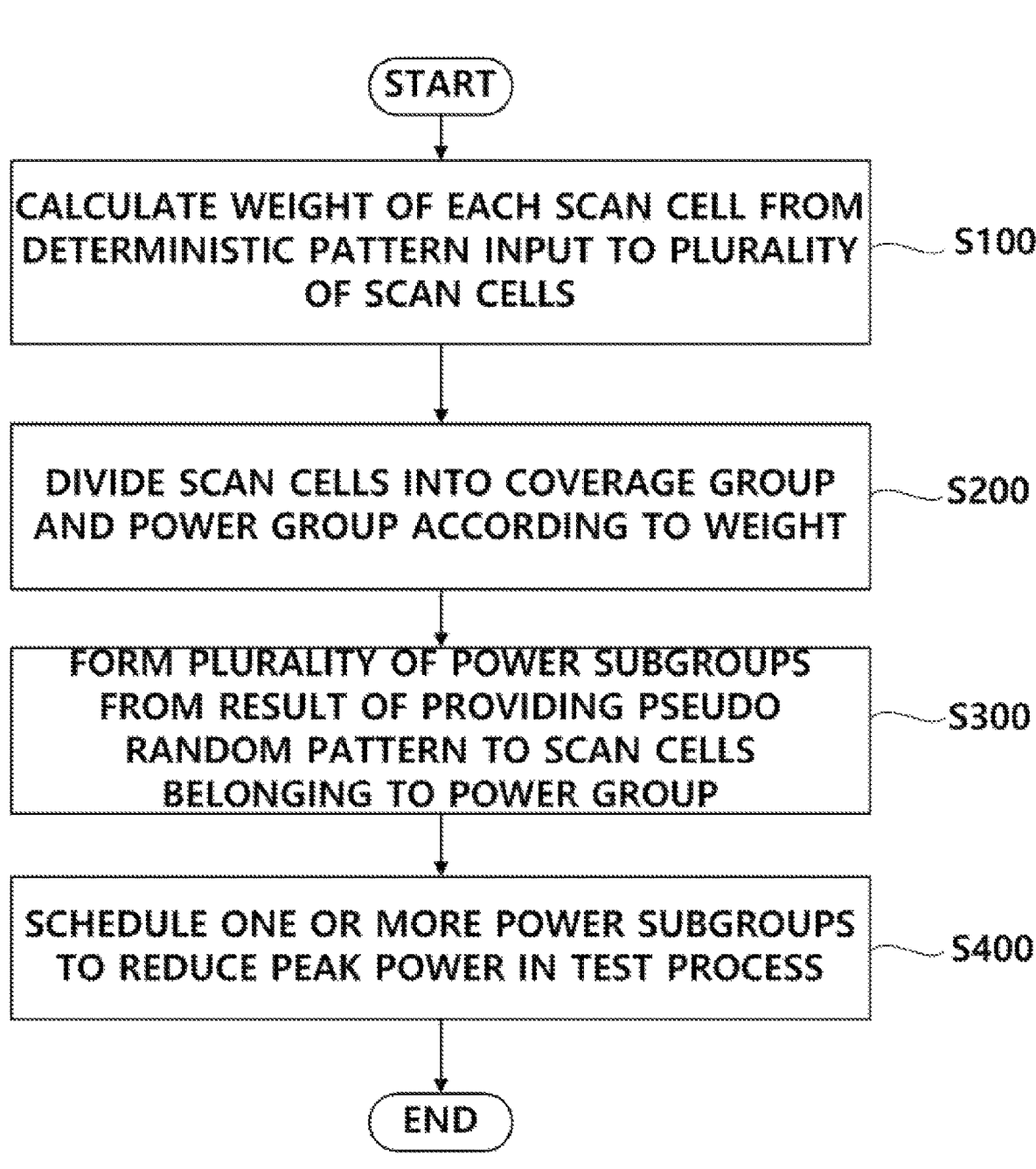
FIG. 1 is a flowchart illustrating an outline of an embodiment.

FIG. 1 is a flowchart illustrating an outline of an embodiment. Referring to FIG. 1, a scan cell placing method according to an embodiment includes calculating a weight of each scan cell from a deterministic pattern input to each of a plurality of scan cells (S100), dividing the scan cells into a coverage group and a power group on the basis of the weight (S200), forming a plurality of power subgroups from a result of providing a pseudo random pattern to the scan cells belonging to the power group (S300), and scheduling one or more of the power subgroups to reduce peak power in a test process (S400).

Figure 2:
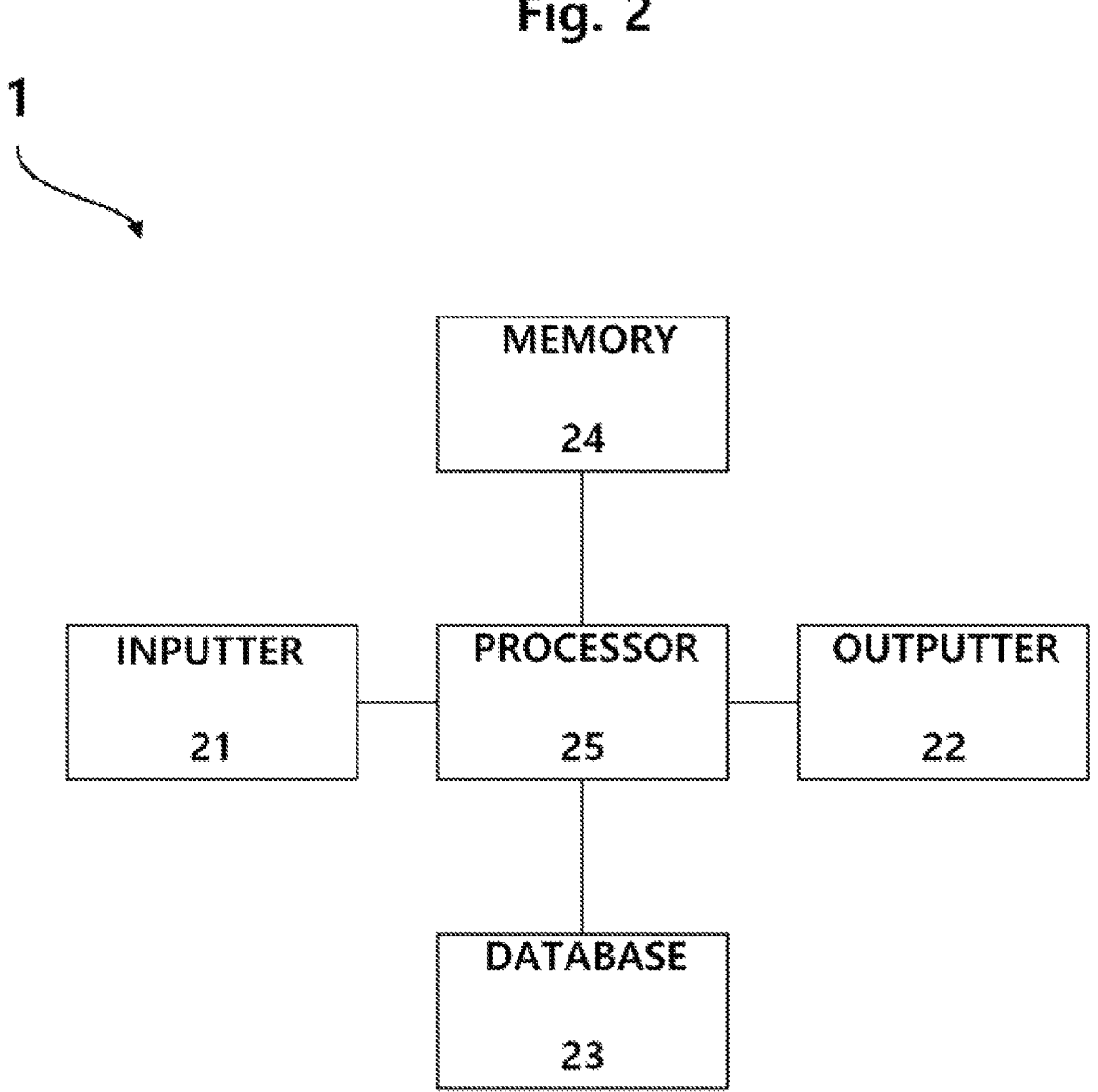
FIG. 2 is a diagram schematically illustrating a scan cell placing apparatus of an embodiment.

FIG. 2 is a diagram schematically illustrating a scan cell placing apparatus 1 of an embodiment. FIG. 2 is a block diagram illustrating an outline of a scan cell placing apparatus 1 of an embodiment. Referring to FIG. 2, the scan cell placing apparatus 1 according to the embodiment includes an inputter 21, an outputter 22, a processor 25, a memory 24, and a database 23.

The scan cell placing apparatus 1 of FIG. 2 is only exemplary, and all blocks illustrated in FIG. 2 are not essential components, and in another embodiment, some blocks may be added, changed, or deleted from the scan cell placing apparatus 1. Meanwhile, the scan cell placing apparatus 1 may be implemented as a computing device for performing a scan cell placing method, and each component included in the scan cell placing apparatus 1 may be implemented as a separate software device or a separate hardware device associated with software.

The scan cell placing apparatus 1 performs calculating a weight of each scan cell from a deterministic pattern input to each of a plurality of scan cells (S100), dividing the scan cells into a coverage group and a power group on the basis of the weight (S200), forming a plurality of power subgroups from a result of providing a pseudo random pattern to the scan cells belonging to the power group (S300), and scheduling one or more of the power subgroups to reduce peak power in a test process (S400).

The inputter 21 is a device for receiving a signal or data corresponding to a test pattern to be input to the scan cells. The inputter 21 may receive the test pattern from an external device such as automatic test equipment (ATE) or an automatic test pattern generator (ATPG). In addition, the inputter 21 may receive various types of signals or data in conjunction with the processor 25 or may directly obtain data in conjunction with an external device and transmit the data to the processor 25. The inputter 21 may be a device or server for inputting or receiving log information such as a test pattern or a fail log, various types of condition information, a control signal, etc., but is not limited thereto.

The outputter 22 may display a response to a test pattern, output an output value, or the like or provide the response, the output value, or the like to the outside, in conjunction with the processor 25. The outputter 22 may display various types of information through a display (not shown), a speaker or the like included in the scan cell placing apparatus 1 to output information, but embodiments are not limited thereto.

The processor 25 performs at least one instruction or program included in the memory 24. The processor 25 according to the present embodiment calculates data for performing each operation on the basis of data obtained from the inputter 21 or the database 23.

The memory 24 includes at least one instruction or program executable by the processor 25. The memory 24 may store an instruction or program for performing processing. The memory 24 may store related values such as a result of performing each operation, an intermediate value, etc.

The database 23 is a general data structure implemented in a storage space (a hard disk or memory) of a computer system using a database management program (DBMS), may be understood to mean a data storage form in which data retrieval (extraction), deletion, editing, addition, etc. may be performed in various ways, may be implemented according to an embodiment of the present disclosure using a relational database management system (RDBMS) such as Oracle, Infomix, Sybase or DB2, an object-oriented database management system (OODBMS) such as Gemston, Orion or O2, or an XML native database such as Excelon, Tamino or Sekaiju, and includes a field or elements appropriate for achieving functions thereof.

The database 23 according to the present embodiment may store a test pattern, log information, diagnosed fault information, condition information, fault diagnosis result information, etc. and provide stored data. Although the database 23 is described as being included in the scan cell placing apparatus 1, it is not necessarily limited thereto and may be implemented as a separate data storage device.

Referring to FIGS. 1 and 2, a deterministic pattern is received from an ATPG. The deterministic pattern is distinguished from a pattern, i.e., a pseudo random pattern, output from an LFSR included in a built-in self-test (BIST) device.

A deterministic test pattern is formed by targeting a fault of a device under test (DUT), and a high fault detection rate and high test coverage may be obtained by providing the deterministic pattern to the DUT. However, the hardware burden is high when the deterministic pattern for the DUT is stored in a BIST device according to a BIST method.

The deterministic pattern is provided to each scan cell included in a BIST. A weight of the deterministic pattern provided to each scan cell is calculated from the deterministic pattern provided to each scan cell (S100). In an embodiment, the weight may be calculated as in Equation 1 below.

$$\omega = \frac{\text{number of first logic state bits}}{\begin{array}{c}\text{total number of bits included in deterministic}\\\text{pattern} - \text{number of } X \text{ bits}\end{array}} \quad \text{[Equation 1]}$$

$$= \frac{\text{number of first logic state bits}}{\begin{array}{c}\text{total number of first logic state } \textit{bits included} \text{ in}\\\text{deterministic pattern} + \text{number of second logic}\\\text{state bits complementary to first logic stages bits}\end{array}}$$

For example, it is assumed that when the deterministic pattern provided to each scan cell is a ten-digit binary number [0101 1001 XX], a first logic state bit is logic 1 and a second logic state bit complementary to the first logic state bit is logic 0. The weight may be calculated by dividing 4, which is the number of first logic states, by 8, which is a result of subtracting the number of X bits, i.e., 2, from the total number of bits, i.e., 10, and may be calculated as 0.5. Alternatively, the weight may be calculated by dividing 4, i.e., the number of first logic states, by 8, which is the sum of the number of first logic state bits, i.e., 4, and the number of second logic state bits, i.e., 4, which are included in the deterministic pattern, and may be calculated as 0.5.

In the above example, the X bit may be a bit that has little or no effect on a test result even when the X bit is 0 or 1. Although it is assumed above that the first logic state bit is logic 1 and the second logic state bit is logic 0, this is only an example, and the first logic state bit may be logic 0 and the second logic state bit may be logic 1.

As shown in Equation 1 above, the weight w may be calculated as 0 when there are no first logic state bits in the deterministic pattern and calculated as 1 when the deterministic pattern consists of only first logic state bits excluding the X bits, and thus may be a real value greater than or equal to 0 and equal to or less than 1.

Figure 3:
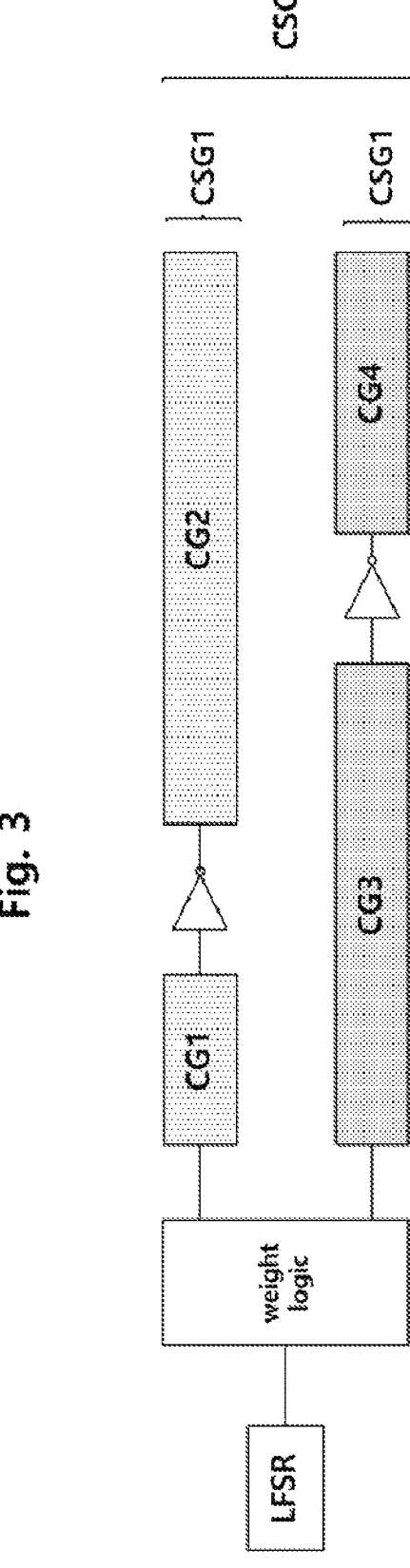
FIG. 3 is a diagram schematically illustrating an example of forming a coverage subgroup.

FIG. 3 is a diagram schematically illustrating an example of forming a coverage subgroup CSG. Referring to FIG. 3, using values of the scan cells that are calculated as described above, scan cells are divided into a coverage group having a greater influence on scan coverage and a power group for reducing peak power consumption by adjusting the scan cells (S200). In an embodiment, the scan cells may have a real number value ranging from 0 to 1 as described above. The scan cells are divided into multiple groups according to a range of weights, i.e., a range of 0 to 1, of the scan cells.

Scan cells having a weight greater than or equal to 0 and less than w1 and scan cells having a weight of 1−w1 or more and 1 or less may be classified as the same coverage subgroup CSG1. For example, when w1 is 0.25, scan cells CG1 having a weight of 0 or more and less than 0.25 and scan cells CG2 having a weight of 0.75 or less are included in the same coverage subgroup.

For example, the scan cells belonging to the same coverage subgroup and having a weight of 0 or more and less than 0.25 should be understood to mean that in the deterministic pattern, the number of logic 0 bits is greater than the number of logic 1 bits. Therefore, when a BIST is performed using corresponding scan cells, it is desirable to provide a pseudo random pattern in which the number of logic 0 bits is greater than the number of logic 1 bits in terms of test coverage and a fault detection rate.

Similarly, the scan cells belonging to the same coverage subgroup and having a weight of 0.75 or more and 1 or less should be understood to mean that in the deterministic pattern, the number of logic 1 bits is greater than the number of logic 0 bits. Therefore, when the BIST is performed using corresponding scan cells, it is desirable to provide a pseudo random pattern in which the number of logic 1 bits is greater than the number of logic 0 bits in terms of test coverage and a fault detection rate.

Ranges of weights of the scan cells CG1 and the scan cells CG2 belonging to the same coverage subgroup are complementary to each other. Accordingly, a pseudo random pattern provided to the scan cells CG2 may be formed by inverting a pseudo random test pattern provided to the scan cells CG1 using an inverter. Accordingly, the coverage subgroup CSG1 may be formed by connecting the scan cells CG1 and the scan cells CG2 through the inverter.

Scan cells having a weight of w1 or more and less than w2 and scan cells having a weight of 1−w2 or more and 1−w1 or less may be classified as the same coverage subgroup CSG1. For example, the same coverage subgroup CSG2 in which w1 is 0.25 and w2 is 0.375 includes scan cells CG3 having a weight of 0.25 or more and less than 0.375 and scan cells CG4 having a weight of 0.625 or more and less than 0.75.

Similarly, a pseudo random pattern provided to the scan cells CG4 may be formed by inverting a pseudo random test pattern provided to the scan cells CG3 using an inverter and thus the coverage subgroup CSG2 may be formed by connecting the scan cells CG3 and the scan cells CG4 through the inverter.

An LFSR outputs a pseudo random pattern in which 0 and 1 are each included with a probability of 0.5. A weight logic circuit is provided with the pseudo random pattern output from the LFSR, forms a desired frequency of logic 0 bits or logic 1 bits, and outputs the logic 0 bits and the logic 1 bits to the first coverage subgroup CSG1 and the second coverage subgroup CSG2, respectively. High scan coverage and a high fault detection rate may be obtained by arranging the scan cells according to a weight and connecting the scan cells in a scan chain.

Figure 4:
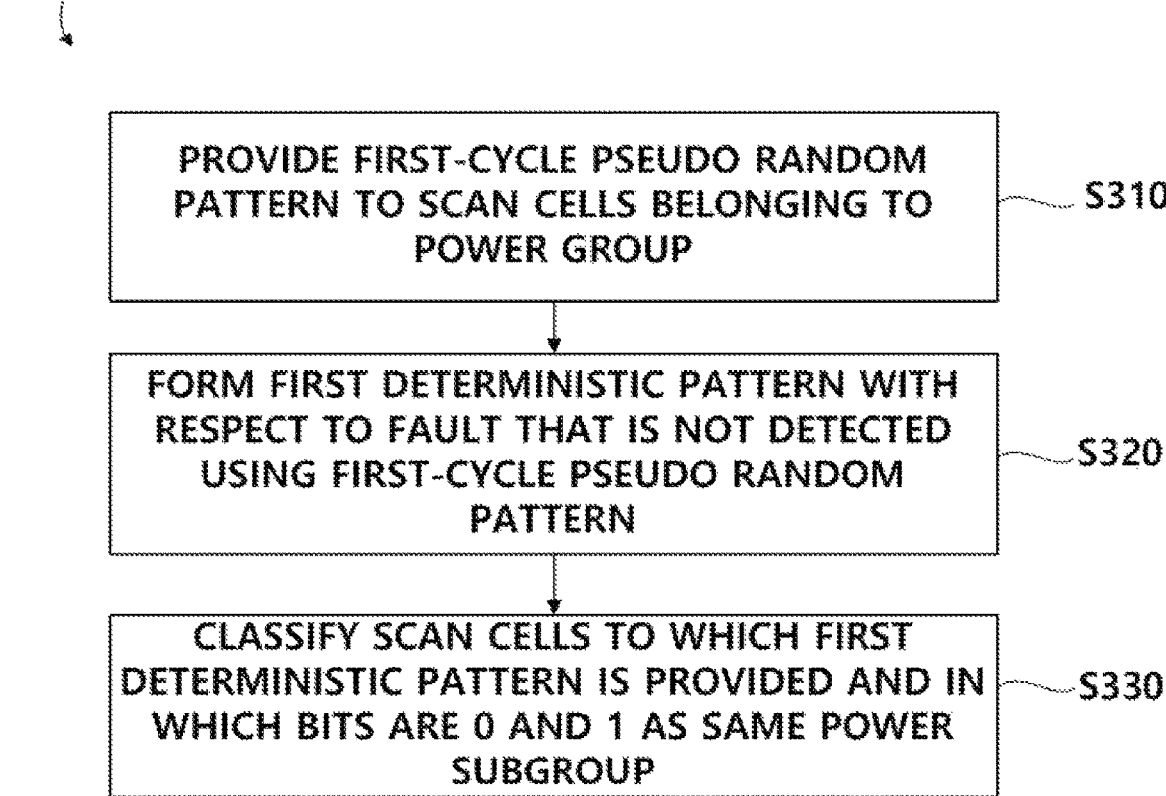
FIG. 4 is a flowchart schematically illustrating forming a plurality of power subgroups by classifying scan cells classified as a power group.
Figure 5:
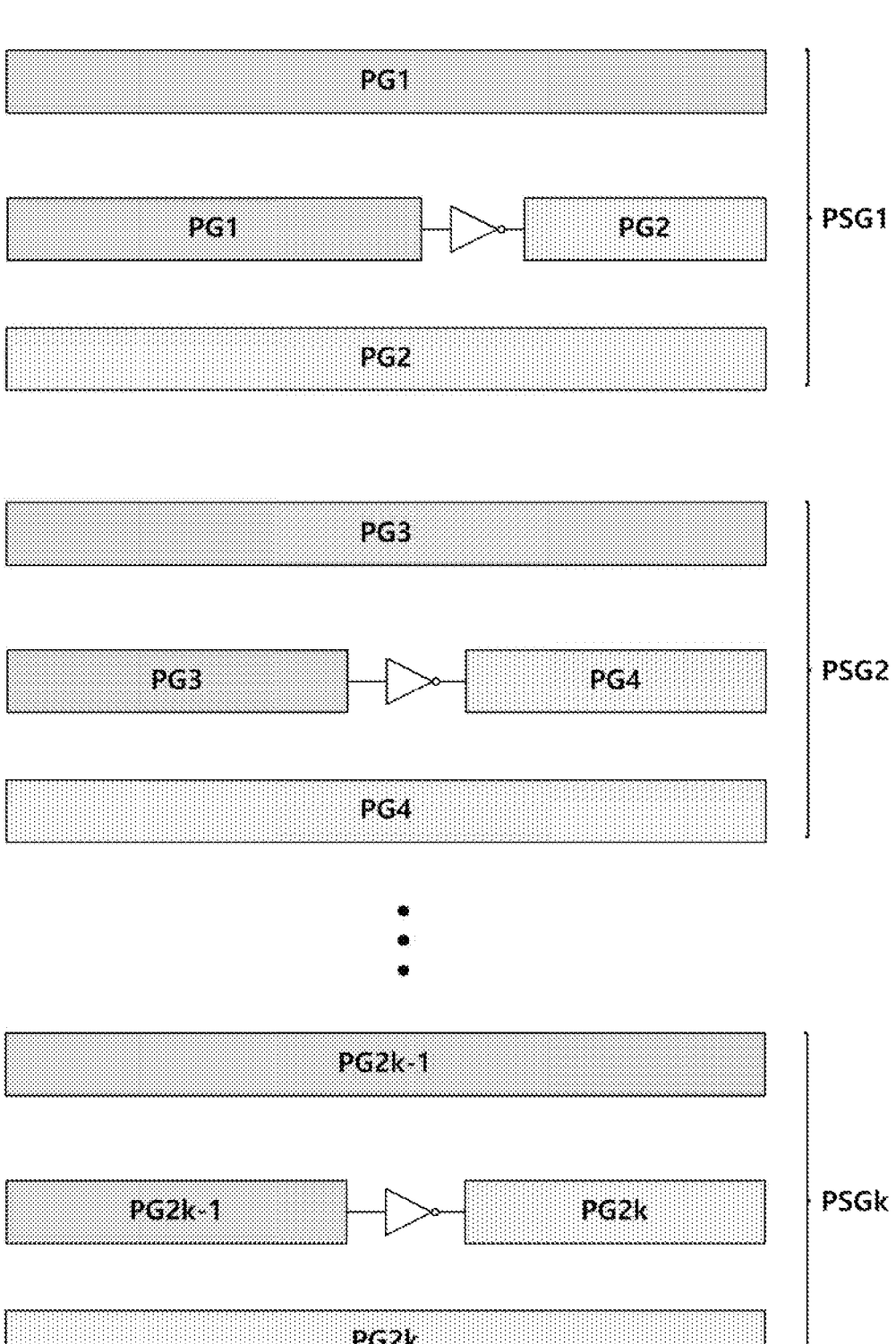
FIG. 5 is a diagram illustrating a power subgroup and a scan chain.

A plurality of power sub-groups are formed for scan cells that do not belong to a coverage group and thus are classified as a power group (S200). FIG. 4 is a flowchart schematically illustrating an operation of forming a plurality of power subgroups by classifying scan cells classified as a power group. FIG. 5 illustrates a power subgroup and a scan chain. Referring to FIGS. 1 to 5, a pseudo random pattern is provided for scan cells classified as a power group. As described above, the pseudo random pattern may be provided by an LFSR and include n k-cycle patterns.

A first-cycle pseudo random pattern is provided to the scan cells classified as the power group (S310), the scan cells provide the pseudo random pattern to a device under test (DUT), and a response output from the DUT is detected. A fault that cannot be detected by the first-cycle pseudo random pattern may be identified by analyzing the detected response.

An ATPG forms a first deterministic pattern by setting, as a target, a fault that cannot be detected by the first-cycle pseudo random pattern (S320). As described above, test coverage and a fault detection rate of the first deterministic pattern are higher than those of the pseudo random pattern provided by the LFSR.

Scan cells provided with a first deterministic pattern of a first logic state and scan cells provided with a first deterministic pattern of a second logic state are formed as the same power subgroup. In an embodiment, scan cells PG1 provided with a first deterministic pattern having bits corresponding to logic 0 and scan cells PG2 provided with a first deterministic pattern having bits corresponding to logic 1 are formed as the same power subgroup PSG1 to detect a fault of the DUT (S330).

The scan cells PG1 may be formed in one scan chain so that the same bit may be input thereto. Similarly, the scan cells PG2 may be formed in another scan chain so that the same bit may be input thereto. Alternatively, the scan cells PG1 and the scan cells PG2 may be connected by an inverter to form a scan chain because bits input to the scan cells PG1 and bits input to the scan cells PG2 are complementary to each other. One power subgroup PSG1 including the scan cells PG1 and the scan cells PG2 formed as described above may be formed and a scan chain may be formed.

A second-cycle pseudo random pattern is provided to scan cells that are not included in the power subgroup PSG1 (S310), and a second deterministic pattern is formed by setting, as a target, a fault that cannot be detected by the second-cycle pseudo random pattern (S320).

Scan cells PG3 provided with a first deterministic pattern of a first logic state and scan cells provided with a first deterministic pattern of a second logic state may be classified as a power subgroup PSG4 as described above, and a scan chain corresponding thereto may be formed. A process of forming a power subgroup may be ended after the process is performed for all cycles of a pseudo random pattern provided by the LFSR.

In a BIST, after scan cells belonging to a power subgroup PSG output a corresponding logic value, a clock signal is not provided to the scan cells. Accordingly, a signal sample may be blocked to reduce unnecessary power consumption in the BIST while a state in which the scan cells output a logic value is held.

FIG. 6 is a flowchart schematically illustrating scheduling one or more power subgroups to reduce peak power in a test process (S400). FIG. 7 is a set of schematic diagrams for describing scheduling one or more power subgroups (S400). Referring to FIGS. 6 and 7, the scheduling of one or more power subgroups (S400) includes determining a weight transition matrix (WTM) value by adjusting the schedule of the one or more power subgroups (S410), comparing the WTM value with a WTM value of a previous schedule (S420), and driving the one or more power subgroups according to the adjusted schedule when the WTM value of the adjusted schedule is less than the WTM value of the previous schedule (S430a) and driving the one or more power subgroups according to the previous schedule when the WTM value of the adjusted schedule is greater than the WTM value of the previous schedule (S430b).

In FIG. 7, a vertical axis represents a WTM, and a horizontal axis represents the number of pseudo random patterns provided from an LFSR. As shown in FIG. 7, a WTM value varies every cycle of a pseudo pattern. For example, a WTM value corresponds to power consumption in a test and thus maximum power consumption in the test may be adjusted by controlling the driving timing of a power subgroup PSG in each cycle of a pseudo random pattern.

Figures 7A, 7B, 7C, 7D:
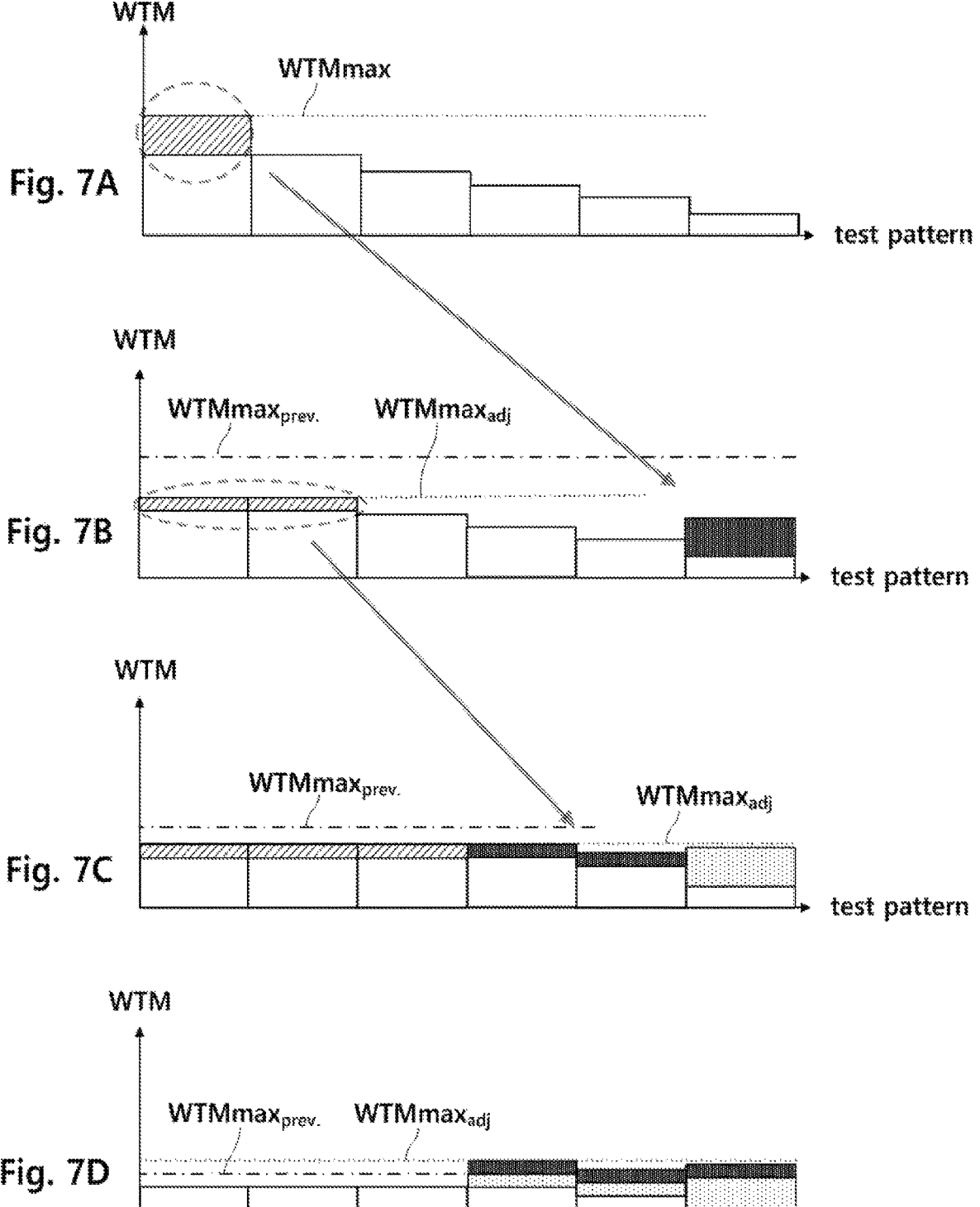
FIGS. 7A, 7B, 7C, and 7D are schematic diagrams for describing scheduling one or more power subgroups.

FIG. 7A shows a WTM value provided to a power subgroup while sequentially increasing a cycle of a test pattern, wherein a hatched area of a first cycle corresponds to a WTM contribution of a first power subgroup. As described above, power consumption decreases because a clock is not provided to the first power subgroup, and a change in the WTM value corresponding to the decrease in the power consumption is indicated by hatched lines.

When the schedule is adjusted such that the first power subgroup is located in a last cycle of a test pattern having a smallest WTM value, the hatched area of FIG. 7A moves to a last cycle of FIG. 7B. A maximum WTM value is determined as $WTMmax_{adj}$ of the state in which the schedule is adjusted (S410). When $WTMmax_{adj}$ is compared with $WTMmax_{prev}$ which is a maximum WTM value of the previous schedule (S420), $WTMmax_{adj}$ which is a maximum WTM value in the adjusted schedule state is less than $WTMmax_{prev}$. Accordingly, the schedule is adjusted to drive the first power subgroup in a driving cycle of the test pattern having the smallest WTM value (S430a).

Referring to FIGS. 7B and 7C, thereafter, the schedules of the second and third power subgroups are adjusted. A maximum WTM value in the state in which the schedules of the second and third power subgroups are adjusted is determined as $WTMmax_{adj}$ as shown in FIG. 7C (S410). When $WTMmax_{adj}$ is compared with $WTMmax_{prev}$ which is a maximum WTM value of the previous schedule (S420), $WTMmax_{adj}$ which is a maximum WTM value in the adjusted schedule state is less than $WTMmax_{prev}$. Accordingly, the schedules are adjusted to drive the second and third power subgroups in a driving cycle having a smallest WTM value (S430a).

Referring to FIGS. 7C and 7D, thereafter, the schedules of fourth to sixth power subgroups are adjusted. A maximum WTM value in the state in which the schedules of the fourth to sixth power subgroups are adjusted is determined as $WTMmax_{adj}$ as shown in FIG. 7D (S410). When $WTMmax_{adj}$ is compared with $WTMmax_{prev}$ which is a maximum WTM value of the previous schedule (S420), $WTMmax_{adj}$ which is a maximum WTM value in the adjusted schedule is greater than $WTMmax_{prev}$. Accordingly, the fourth to sixth power subgroups are driven in a previous cycle (S430b).

Maximum peak power may be reduced in a BIST by performing scheduling as described above.

Although the present disclosure has been described above with reference to embodiments shown in the accompanying drawings to help understand the present disclosure, the embodiments are only examples and it will be understood by those of ordinary skill in the art that various modifications may be made and equivalent embodiments may be implemented. Therefore, the scope of the present disclosure should be defined by the appended claims.

What is claimed is:

1. A scan cell placing method comprising:
   calculating a weight of each scan cell from a deterministic pattern input to a plurality of scan cells;
   dividing the scan cells into a coverage group and a power group according to the weight;
   forming a plurality of power subgroups from a result of providing a pseudo random pattern to scan cells belonging to the power group; and
   scheduling one or more of the power subgroups to reduce peak power in a test process,
   wherein the calculating of the weight comprises calculating a weight by dividing the number of first-logic state bits included in a deterministic test pattern provided to the scan cell by a value obtained by subtracting the number of first-logic state bits included in the deterministic test pattern provided to the scan cell from the sum of the number of the first logic state bits and the number of second logic state bits complementary to the first logic state bits.

2. The scan cell placing method of claim 1, wherein the deterministic pattern is generated by an automatic test pattern generator (ATPG).

3. The scan cell placing method of claim 1, wherein the calculating of the weight comprises calculating a weight by dividing the number of first logic state bits included in a deterministic test pattern provided to the scan cell by a value obtained by subtracting the number of X bits from a total number of bits included in the deterministic test pattern.

4. The scan cell placing method of claim 1, wherein the dividing of the scan cells into the coverage group and the power group is performed by classifying scan cells having a weight of 0 or more and less than w1 and scan cells having a weight of 1−w1 or more and 1 or less as a coverage subgroup, wherein w1 is a real number greater than or equal to 0 and equal to or less than 1.

5. The scan cell placing method of claim 4, wherein the scan cells having the weight of 0 or more and less than w1 are connected in the same scan chain to the scan cells having the weight of 1−w1 or more and 1 or less by an inverter.

6. The scan cell placing method of claim 4, wherein the dividing of the scan cells into the coverage group and the power group is performed by classifying scan cells having a weight of w1 or more and less than w2 and scan cells having a weight of 1−w2 or more and less than 1−w1 as a second coverage subgroup, wherein w2 is a real number greater than w1 and greater than or equal to 0 and equal to or less than 1.

7. The scan cell placing method of claim 4, wherein scan cells having a weight of w1 or more and less than w2 are connected in the same scan chain to scan cells having a weight of 1−w2 or more and less than 1−w1 by an inverter.

8. The scan cell placing method of claim 4, wherein the dividing of the scan cells into the coverage group and the power group is performed by classifying the remaining scan cells as the power group.

9. The scan cell placing method of claim 1, wherein the forming of the plurality of power subgroups comprises:

providing a first-cycle pseudo random pattern to the scan cells belonging to the power group;

forming a first deterministic pattern with respect to a fault that is not detected using the first-cycle pseudo random pattern; and classifying scan cells to which the first deterministic pattern is provided and in which bits are 0 and 1 as the same power subgroup.

10. The scan cell placing method of claim 9, wherein the forming of the plurality of power subgroups is ended when all of the scan cells belonging to the power group belong to the power sub-groups or the plurality of power subgroups are formed in all cycles of the pseudo random pattern.

11. The scan cell placing method of claim 1, wherein the scheduling of the one or more of the power subgroups comprises:

determining a weight transition matrix (WTM) value by adjusting a schedule of the one or more of the power subgroups;

comparing the WTM value with a WTM value of a previous schedule; and driving the one or more of the power subgroups according to the adjusted schedule when the WTM value of the adjusted schedule is less than the WTM value of the previous schedule.

12. The scan cell placing method of claim 1, wherein the scheduling of the one or more of the power subgroups comprises:

determining a weight transition matrix (WTM) value of a current schedule of the one of more of the power subgroups;

comparing the WTM value with a WTM value of a previous schedule; and driving the one or more of the power subgroups according to the previous schedule when the WTM value of an adjusted schedule is greater than the WTM value of the previous schedule.

13. A scan cell placing apparatus for placing scan cells on which a built-in self-test of a semiconductor circuit is performed, the apparatus comprising:

at least one processor; and a memory storing one or more programs executable by the at least one processor, wherein, when the one or more programs are executed by the at least one processor, the at least one processor performs a test method, wherein the test method comprises:

calculating a weight of each scan cell from a deterministic pattern input to a plurality of scan cells;

dividing the plurality of scan cells into a coverage group and a power group according to the weights;

forming a plurality of power subgroups from a result of providing a pseudo random pattern to scan cells belonging to the power group; and rearranging one or more of the plurality of power subgroups to reduce peak power in a test process, wherein the calculating of the weight comprises calculating a weight by dividing the number of first logic state bits included in a deterministic test pattern provided to the scan cell by a value obtained by subtracting the number of first logic state bits from the sum of the number of the first logic state bits and the number of second logic state bits complementary to the first logic state bits.

14. The apparatus of claim 13, wherein the deterministic pattern is generated by an automatic test pattern generator (ATPG).

15. The apparatus of claim 13, wherein the calculating of the weight comprises calculating a weight by dividing the number of first logic state bits included in a deterministic test pattern provided to the scan cell by a value obtained by subtracting the number of X bits from a total number of bits included in the deterministic test pattern.

16. The apparatus of claim 13, wherein the dividing of the scan cells into the coverage group and the power group is performed by classifying scan cells having a weight of 0 or more and less than w1 and scan cells having a weight of 1−w1 or more and 1 or less as a coverage subgroup, wherein w1 is a real number greater than or equal to 0 and equal to or less than 1.

17. The scan cell placing apparatus of claim 16, wherein the scan cells having the weight of 0 or more and less than w1 are connected in the same scan chain to the scan cells having the weight of 1−w1 or more and 1 or less by an inverter.

18. The apparatus of claim 16, wherein the dividing of the scan cells into the coverage group and the power group is performed by classifying scan cells having a weight of w1 or more and less than w2 and scan cells having a weight of 1−w2 or more and less than 1−w1 as a second coverage subgroup, wherein w2 is a real number greater than w1 and greater than or equal to 0 and equal to or less than 1.

19. The apparatus of claim 16, wherein scan cells having a weight of w1 or more and less than w2 are connected in the same scan chain to scan cells having a weight of 1−w2 or more and less than 1−w1 by an inverter.

20. The apparatus of claim 16, wherein the dividing of the scan cells into the coverage group and the power group is performed by classifying the remaining scan cells as the power group.

21. The apparatus of claim 13, wherein the forming of the plurality of power subgroups comprises:

providing a first-cycle pseudo random pattern to the scan cells belonging to the power group;

forming a first deterministic pattern with respect to a fault that is not detected using the first-cycle pseudo random pattern; and classifying scan cells to which the first deterministic pattern is provided and in which bits are 0 and 1 as the same power subgroup.

22. The apparatus of claim 21, wherein the forming of the plurality of power subgroups is ended when a plurality of power subgroups are formed in all cycles of the pseudo random pattern.

23. The apparatus of claim 13, wherein the scheduling of the one or more of the power subgroups comprises:

determining a weight transition matrix (WTM) value by adjusting a schedule of the one or more of the power subgroups;

comparing the WTM value with a WTM value of a previous schedule; and driving the one or more of the power subgroups according to the adjusted schedule when the WTM value of the adjusted schedule is less than the WTM value of the previous schedule.

24. The apparatus of claim 13, wherein the scheduling of the one or more of the power subgroups comprises:

determining a weight transition matrix (WTM) value of a current schedule of the one or more of the power subgroups;

comparing the WTM value with a WTM value of a previous schedule; and driving the one or more of the power subgroups according to the previous schedule when the WTM value of an adjusted schedule is greater than the WTM value of the previous schedule.

\* \* \* \* \*